United States Patent Office 3,542,725
Patented Nov. 24, 1970

3,542,725
PLASTIC COMPOSITIONS CONTAINING SULFITE AND THIOL STABILIZERS
Adam F. Kopacki, Westwood, N.J., Stanley B. Mirviss, Stamford, and Sheldon F. Gelman, Danbury, Conn., assignors to Stauffer Chemical Company, New York, N.Y., a corporation of Delaware
No Drawing. Filed June 3, 1968, Ser. No. 733,816
Int. Cl. C08f 45/62; C08g 51/62
U.S. Cl. 260—45.75
9 Claims

ABSTRACT OF THE DISCLOSURE

A polymeric composition consisting essentially of a polymer selected from the class consisting of hydrocarbon, a substituted hydrocarbon, a polystyrene, a vinyl polymer and copolymers and terpolymers thereof, stabilized against color degradation by incorporating therein a stabilizing quantity of a stabilizer consisting of a mixture of a sulfite ester or salt composition and a thiol acid anhydride. The sulfite ester has the following formula:

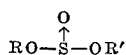

wherein R can be selected from the group consisting of an alkyl group having from 1 to 24 carbon atoms, an aryl group, an alkylaryl group, an arylalkyl group, a metallic cation, and mixtures thereof, and R' can be selected from the group consisting of hydrogen, an alkyl group having from 1 to 24 carbon atoms, an aryl group, alkylaryl group, an arylalkyl group, a metallic cation and mixtures thereof. The thiol acid anhydride has the following formula:

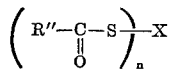

wherein R'' is a hydrocarbyl group containing from 3 to about 21 carbon atoms, $n$ is an integer having a value of from 1 to 2, X is selected from the group consisting of hydrogen, alkali metal, alkaline earth metal, and acyl moieties having a hydrocarbyl essentially hydrocarbon residue and containing from about 1 to about 17 carbon atoms inclusive.

BACKGROUND OF THE INVENTION

It is well known that plastics and polymeric materials generally are susceptible to a characteristic type of degradation when exposed to heat during the conventional milling and so forth of the polymeric compositions. For example, chlorovinyl polymers such as polyvinyl chloride undergo discoloration and degradation at the elevated temperatures required for operations such as molding and product formation. In order to overcome this problem, a suitable amount of a heat stabilizing composition is generally blended with plasticized or unplasticized resinous material prior to molding. One suitable component of a commercial stabilization composition employed widely today is stearic acid metallic salts. The stearic acid derivatives have found wide acceptance because they are readily available at a low cost and are generally non-toxic. Unfortunately, stearic acid salts are unsuitable for general use and especially at the high processing temperatures required to work the rigid, unplasticized polyvinyl chloride and permit discoloration and aggregation after a relatively short period of time. This occurs even at the lower temperatures of about 310° F. required for processing of flexible color plasticized polyvinyl chloride. Other known stabilizers for polyvinyl chloride include the organotin compounds, which because of their unusual heat stabilizing properties set a standard for heat stability which is difficult to equal. However, the organotin compounds have the disadvantage that they are very expensive and some are rather toxic, which greatly limits their scope of application.

More recently, it has been proposed to employ thiol acid anhydrides such as thiolauric anhydride, thioloeic anhydride, thiolbenzoic anhydride and thiolstearic anhydride. These stabilizers do, in fact, impart greater stability to the polymeric compositions during normal operations of working of the polymers, but a gradual color formation has been noted. This side effect cannot be tolerated where a clear or colorless polymer is needed.

BRIEF DESCRIPTION OF THE INVENTION

It has been discovered that excellent stabilization of polymers can be achieved without encountering the aforesaid undesirable side effects by incorporating into the polymer a small amount of a sulfite ester or salt composition which greatly reduces the color formation at the elevated temperatures. The sulfite ester or salt composition can be in the form of an organic ester, inorganic salt, or mixtures thereof with the following formula:

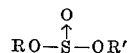

wherein R can be selected from the group consisting of an alkyl group having from 1 to 24 carbon atoms, an aryl group, an alkylaryl group, an arylalkyl group, a metallic cation, and mixtures thereof, and R' can be selected from the group consisting of hydrogen, an alkyl group having from 1 to 24 carbon atoms, an aryl group, alkylaryl group, an arylalkyl group, a metallic cation and mixtures thereof.

Excellent color stabilization is achieved when the above-noted sulfite ester or salt composition is combined with a composition having the formula:

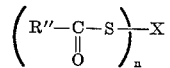

wherein R'' is a hydrocarbyl group containing from 3 to about 21 carbon atoms, $n$ is an integer having a value of from 1 to 2, X is selected from the group consisting of hydrogen, alkali metal, alkaline earth metal, and acyl moieties having a hydrocarbyl essentially hydrocarbon residue and containing from about 1 to about 17 carbon atoms inclusive.

DETAILED DESCRIPTION OF THE INVENTION

In practicing the present invention, the sulfite material is blended or incorporated into the polymer by any of the conventional methods commonly employed for mixing such materials with resins or plastics. A typical procedure comprises milling on heated rolls, although deposition with solvents and dry blending are well known techniques. Additionally, they can be dispersed therein prior to the polymerization step of the polymer as is well understood in the art. The sulfite esters are well known chemical entities, the description and preparation of which can be found in the technical and chemical literature. The sulfite esters and salts usable may be selected from the group consisting of dibutyl sulfite, diphenethyl sulfite, diethyl sulfite, diphenyl sulfite, diisooctyl sulfite, sodium butyl sulfite, potassium decyl sulfite, dibenzyl sulfite, sodium bisulfite, potassium bisulfite, sodium sulfite, zinc sulfite and calcium bisulfite.

In using the stabilizers of this invention, it has been found that they are effective in protecting poly-α-olefins, poly-diolefins, copolymers of olefins, or olefins and diolefins and other hydrocarbon polymers, polymers, copolymers and terpolymers of substituted vinyl compounds, styrenes, and polyesters against deterioration and formation of color bodies due to the exposure to heat. The polymer compositions stabilized in accordance with this invention exhibit an extended life expectancy and are much more useful and practical than unstabilized polymers and possess a wide diversity of uses including installations requiring prolonged exposure to the sunlight and the elements. Moreover, the sulfite compositions, although inordinately effective as stabilizers, do not produce any undesirable side effects. In particular, the sulfite esters exhibit exceptional stability against color degradation when combined with a thiol acid anhydride represented by the formula:

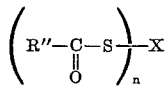

wherein R" is a carbonyl compound containing from 3 to about 21 carbon atoms, $n$ is an integer having a value of 1 to 2, X is selected from the group consisting of hydrogen, alkali metal, alkaline earth metal, and acyl moieties having a hydrocarbyl essentially hydrocarbon residue and containing from about 1 to about 17 carbon atoms inclusive. For example, these thiol acid anhydride stabilizers can be selected from thiolauric anhydride, thioloeic anhydride, thiolbenzoic anhydride and thiolstearic anhydride, free thiol acids and the like.

The amount of stabilizers as illustrated by the thiol acid anhydrides or acids and the sulfite esters or salt compositions can be present in an amount ranging between 0.05 and 2 parts by weight of the sulfite ester and between 0.1 and 10.0 parts by weight of the anhydride composition. The above amounts being based on 100 parts resin. The thiol acid anhydrides are also well known chemical entities, the description and preparation of which can be found in technical and chemical literature.

The polymer stabilized as contemplated herein can be cast, extruded, rolled or molded into sheets, rods, tubes, piping, filaments and other shaped articles, including sheets or films ranging from 0.5 to 100 mils in thickness. The polymer compositions of this invention can be applied as coatings to paper, cloth, wire, metal foil and are suitable for manufacture of synthetic fibers and fabrics. Although the quantity of stabilizer is not particularly critical, it is recommended that the concentration based on the weight of the polymer be maintained in the neighborhood of between 0.1% to about 10% by weight.

The sulfite esters and salts as described herein are suitable for stabilizing a wide variety of solid polymer compositions against deterioration brought on by heat. In this connection, mention is made of any of the normally solid polymers derived from the polymerization of α-mono-olefinic aliphatic and aryl substituted aliphatic hydrocarbons containing from 2 to 10 carbon atoms. Typical poly-α-olefins include polyethylene, polypropylene, poly(3-methylbutene-1), poly(4-methylbutene-1), poly(4-methylpentene-1), poly(pentene-1), poly(3,3-dimethylbutene-1), poly(4,4-dimethylbutene-1), poly(octene-1), poly(decene-1), polystyrene and the like. Copolymers of such olefins are those prepared with ethylene and propylene or ethylene and the butenes or the like, are also protected as are polydiolefins, i.e., polybutadiene, or polyisoprene and olefin-diolefin copolymers of the type as butadiene-styrene or isobutylene - isoprene copolymers. Polymeric materials prepared from olefins and/or diolefins containing some vinylic monomers such as acrylonitrile and styrene as illustrated by the so-called ABS resins, acrylonitrile, butadiene and styrene terpolymers, are considered to be within the scope of this invention as are homopolymers of substituted vinyl monomers such as vinyl chloride, vinyl iodine dichloride, vinyl acetate, acrylonitrile and the like. Polyester resins with or without added styrene, divinyl benzene and the like are also stabilized by means of the sulfite esters.

Although the molecular weight of the polymers varies over wide limits, the stabilizer compounds of this invention are not restricted to any particular molecular weight range of polymer, and in fact it has been found that excellent protection can be realized with polymers having a broad or narrow range. Moreover, the so-called amorphous low molecular weight poly-α-olefin waxes or oils are likewise susceptible to the stabilization by means of the compound of this invention.

Polyesters which can be protected against ultraviolet radiation such as by means of hydroxybenzophenones or aryl salicylates are well known chemical entities and are described at length in technical literature and numerous U.S. patents. One type of polyester is derived from the addition polymerization of ethylenically unsaturated organic esters, particularly vinyl ester monomers, and in this connection mention is made of acrylic esters, vinyl esters and the like. The polymerization is commonly effectuated by contacting the monomer with a polymerization initiator such as an organic peroxide with or without the application of heat.

Another type of polyester which can be stabilized in accordance with this invention is formed by the successive esterification of dicarboxylic acids with polyglycols. The resulting polymeric esters consist of alternate linkages of the dicarboxylic acid and polyglycol residues produced by the elimination of water from between the reactants. The resulting polymers may be linear or cross-linked, depending on the selection of the components. For instance, a diglycol wherein the hydroxyl groups are terminally situated produce a linear type of polyester whereas polyglycols as exemplified by glycerol give rise to a cross-linking polymer formed by reacting glycerol with the dicarboxylic acid, such as phthalic acid, in the form of its anhydride.

Modifications of polyesters are the well known alkyd resins which are obtained by forming a polyester by reacting a polyglycol and an α-β-ethylenically unsaturated di or polycarboxylic acid or anhydride such as maleic anhydride and cross-linking the residual ethylene double bond with a suitable cross-linking agent.

In a more specific and detailed sense, the alkyd resins as above referred to having a plurality of polymerizable α-β-ethylenically unsaturated linkages may be produced by combining together a polyhydric alcohol with a polycarboxylic acid or its anhydride which contains α-β-ethylenic unsaturation. It is generally understood that the acid or its anhydride includes the designation polycarboxylic acid and such terminology will be understood in the description as herein set forth. Saturated carboxylic acids are also frequently included in the reaction mixture for the purpose of modifying the properties of the resin. From the standpoint of cost, the unsaturated polycarboxylic acids most commonly used are maleic, usually in the form of anhydride, and fumaric acid. Other α-β-unsaturated carboxylic acids which may be employed are exemplified by citraconic, itaconic, aconitic and mesaconic acids. The chemical and technical literature can be consulted for the names of other suitable acids. An acid often used for modifying the properties of a polyester resin is phthalic acid, commonly in the form of its anhydride. Other such acids with benzenoid or aromatic unsaturation which behave as saturated acids in that their benzenoid unsaturated structure does not enter into any common ethylenic type polymerization are commonly selected to produce various and particular properties and effects in the alkyd resin. In this connection, reference is made to such acids as isophthalic, adipic, azelaic, tetrachlorophthalic acid, sebacic, suberic, endomethylenetetrahydrophthalic and hexachloroendomethylenetetrahydrophthalic.

As illustrative of the polyhydric alcohols applicable for the synthesis of alkyd resins, mention is made of ethylene glycol, diethylene glycol, propylene glycols, dipropylene glycol, butylene glycol and the like. Here again, the literature may be consulted for the names of the less common polyglycols. It should be pointed out that as with the dicarboxylic acid a polyglycol alcohol may be selected which is ethylenically unsaturated and thereby giving residual ethylenic double bonds for the purpose of cross-linking the polyester with concomitant modification in physical and chemical properties.

In preparing an alkyd resin, the polycarboxylic acid and appropriate polyhydric alcohol are commonly reacted at elevated temperatures in the presence of an inert atmosphere. The reaction is normally carried out at a temperature ranging from about 150° C. to about 230° C.; the inert atmosphere is conveniently provided by carbon dioxide or nitrogen gas. Generally, the total number of moles of alcohol exceed the total number of moles of acid by about 5 to 20% since the latter figures are required to effect complete esterification, although the proportions are not critical. A relatively inert organic solvent such as xylene is sometimes useful in carrying out the reaction. Since the reaction is an esterification, water is given off and should be removed from the system. After essentially all of the water has been expelled, any solvent is removed and after the mixture cooled, the appropriate unsaturated monomeric cross-linking agent added. If cross polymerization or linkage is to be prolonged, the presence of a suitable inhibitor is necessary.

Unsaturated monomers suitable for use as cross-linking agents can be selected from a wide variety of polymerizable compounds characterized by the presence of a $CH_2=CH-$ group. Examples of such monomers are styrene, vinyl toluene, methyl acrylate, divinyl benzene, diallyl phthalate, dimethyl styrene, methyl methacryate, vinyl acetate, butadiene and the like. It is also a common practice to employ special monomers in order to secure particular effects. In this connection, mention is made of triallyl cyanurate useful in imparting high heat resistance to the resins, alkylallyl diglycolate for use as a refractive modifier, while dialkyl phenylphosphonate has been employed to impart fire resistance.

Three groups of components which have been found particularly suitable and convenient for preparing polyesters are: (1) acids such as maleic, fumaric, itaconic, phthalic and the like; (2) alcohols or glycols such as allyl alcohol, ethylene glycol and diethylene glycols; (3) unsaturated hydrocarbons such as styrene, cyclopentadiene and the like. Also polyesters containing an alkenyl aryl cross-linking agent such as diallyl phtthalate, and a reaction product of an $\alpha$-$\beta$-ethylenically unsaturated polycarboxylic acid, such as maleic or fumaric acid, a saturated polycarboxylic acid free of non-benzoid unsaturation, such as phthalic acid and at least one glycol such as ethylene glycol and/or diethylene glycol, may be used.

The amounts of the components useful in preparing polyesters may vary widely. In most instances, approximately two parts by weight of an unsaturated alkyd resin to one part by weight of the monomeric cross-linking agent is suitable, although as above mentioned, the proportions may be varied over wide limits.

Another important polymer which can be stabilized in accordance with this invention is polyvinyl chloride. This polymer is commonly produced by the emulsion polymerization using a redox initiator for polymerizing vinyl chloride. One type of polyvinyl chloride is the so-called rigid or unplasticized polyvinyl chloride and this particular modification of polyvinyl chloride can be effectively stabilized by the compounds of the invention. As has been previously pointed out elsewhere herein, the sulfite esters are effective as stabilizers either for the polymers themselves or various copolymers and terpolymers and mixtures thereof. One class of polymer compositions which lends itself to stabilization by means of the compounds of the invention is resin mixtures which are blends or copolymers of a plastic such as polystyrene or styrene-acrylonitrile copolymer with a rubber, usually a butadiene-acrylonitrile copolymer. Such compositions may be intimate physical mixtures of the two components, the so-called poly blends or a true terpolymer, that is, an ABS resin possibly produced by block or graft techniques. An example of the latter case is a graft copolymer of styrene or nitrile rubber. Typical compositions include 20 to 30% butadiene and 40 to 60% styrene. The abbreviations ABS are taken from the initial letters of the three monomers.

The following examples illustrate the procedure for preparing stabilized polymer compositions of the invention, although the inclusion of such examples is not to be taken as limiting or otherwise imposing any restriction on the invention, and it is to be understood that variations in practicing the same without departing from the scope or spirit thereof will be apparent to those skilled in the art to which this invention pertains.

EXAMPLE 1

A polyvinyl chloride resinous formulation was blended by adding 100 parts of the polyvinyl chloride to a mixing vessel along with 30 parts dialkyl phthalate and mixed thoroughly. Thereafter, three parts of thiolauric anhydride along with 0.5 part stearic acid and 0.5 part di-n-butyl sulfite were added and thoroughly blended therewith. The formulation was hand stirred and then poured into a two roll mill at 350° F. The shear ratio of the rolls was 1:1.4. Five minutes after the material was poured on the mill a sample was taken. Thereafter, samples were removed at ten minute intervals. A control formulation was made omitting the di-n-butyl sulfite. The samples so obtained were measured on a Hunter D-25 Color Difference Meter and from the 1, a and b values obtained, the total color difference $\Delta E$ was calculated, employing the formula $$\Delta E = \sqrt{(\Delta 1)^2 + (\Delta a)^2 + (\Delta b)^2}$$

A $\Delta E$ value of 1 is arbitrarily set as the smallest color difference a color matcher can detect by eye. The $\Delta E$ values of the samples obtained are tabulated below:

| Material | $\Delta E$ values of samples | | | | |
| --- | --- | --- | --- | --- | --- |
| | Time from band | | | | |
| | 0.0 | 10.0 | 20.0 | 30.0 | 40.0 |
| Di-n-butyl sulfite | 5.01 | 5.34 | 7.50 | 10.14 | 11.18 |
| Control | | 13.58 | 20.43 | 25.78 | 31.07 |

EXAMPLE 2

The formation as set forth in Example 1 was repeated in its entirety except diethyl sulfite was employed in lieu of the di-n-butyl sulfite. The results obtained are set out below:

| Material | $\Delta E$ values of samples | | | | |
| --- | --- | --- | --- | --- | --- |
| | Time from band | | | | |
| | 0.0 | 10.0 | 20.0 | 30.0 | 40.0 |
| Diethyl sulfite | 5.38 | 8.39 | 10.84 | 15.36 | 18.11 |
| Control | | 13.58 | 20.43 | 25.78 | 31.07 |

EXAMPLE 3

The formulation as set forth in Example 1 was represented in its entirety except sodium bisulfite was employed in lieu of the di-n-butyl sulfite. The results obtained paralleled those obtained in Example 1.

EXAMPLE 4

The formulation as set forth in Example 1 was repeated in its entirety except the amount of organic sulfite employed was 0.1 part by weight and a second formulation having 1.0 part by weight organic sulfite admixed therein. The results obtained paralleled the results obtained in Example 1.

EXAMPLE 5

When the procedure of Example 1 is repeated by substituting polyethylene in lieu of polyvinyl chloride, the results obtained paralleled those obtained in Example 1.

EXAMPLE 6

When the procedure of Example 1 is repeated, but in this case the polymer is a terpolymer obtained by polymerizing a mixture of acrylonitrile, butadiene and styrene and is of the high impact type commonly referred to as ABS polymers, the results obtained agree with Example 1.

EXAMPLE 7

When the procedure of Example 1 is repeated by substituting polystyrene in lieu of the polyvinyl chloride, the results obtained paralleled those obtained in Example 1.

EXAMPLE 8

The components for manufacturing a polyvinyl chloride resin were charged to a reaction vessel along with three parts by weight thiolauric anhydride and 0.5 part by weight sodium bisulfite. Thereafter, the reaction vessel was heated and the components were polymerized in a conventional manner. Then, a polyvinyl chloride resin formulation was made by blending 30 parts by weight dialkyl phthalate and 0.5 part stearic acid thereto. The formation was worked up in the same manner as set forth in Example 1. The results obtained for the ΔE values compared to those obtained in Example 3.

What is claimed is:

1. A polymer composition comprising a solid polymer selected from the class consisting of the homo- and copolymers of α-olefins, the homo- and copolymers of vinyl monomers, the homo- and copolymers of diolefins and the alkyd resins, and as a stabilizer therefor a stabilizing quantity of a stabilizer mixture consisting of: (1) a sulfite ester or salt having the following formula:

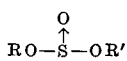

wherein R is selected from the group consisting of an alkyl group having from 1 to 24 carbon atoms, an aryl group, an alkylaryl group, an arylalkyl group, a metallic cation selected from Groups I-A, II-A and II-B of the Periodic Table and mixtures thereof, and R' is selected from the group consisting of hydrogen, an alkyl group having from 1 to 24 carbon atoms, an aryl group, an alkylaryl group, an arylalkyl group, a metallic cation selected from Groups I-A, II-A and II-B of the Periodic Table and mixtures thereof, and (2) a thiol acid anhydride, thiol acid or thiol acid salt having the formula:

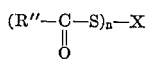

wherein R" is a hydrocarbyl group containing from 3 to about 21 carbon atoms, n is an integer having a value of from 1 to 2, X is selected from the group consisting of hydrogen, alkali metal, alkaline earth metal, and acyl moieties having a hydrocarbyl essentially hydrocarbon residue having from 1 to 17 carbon atoms.

2. The composition according to claim 1, wherein the solid polymer is a poly-α-olefin homopolymer.

3. The composition according to claim 2, wherein the poly-α-olefin is polypropylene.

4. The composition according to claim 2, wherein the poly-α-olefin is polyethylene.

5. The composition according to claim 1, wherein the solid polymer is polyvinyl chloride.

6. The composition according to claim 1, wherein said polymer is polystyrene.

7. The composition according to claim 1, wherein the sulfite ester stabilizer is present in an amount, as based on 100 parts, by weight, of the polymer, ranging between 0.05 and 2 parts by weight and said thiol acid anhydride is present in an amount ranging between 0.1 and 10 parts by weight.

8. A stabilizer composition consisting essentially of a mixture of (1) a sulfite ester having the following formula:

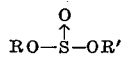

wherein R is selected from the group consisting of an alkyl group having from 1 to 24 carbon atoms, an aryl group, an alkylaryl group, an arylalkyl group, a metallic cation selected from Groups I-A, II-A and II-B of the Periodic Table and mixtures thereof, and R' can be selected from the group consisting of hydrogen, an alkyl group having from 1 to 24 carbon atoms, an aryl group, an alkylaryl group, an arylalkyl group, a metallic cation selected from Groups I-A, II-A and II-B of the periodic table and mixtures thereof, and (2) a thiol acid anhydride, thiol acid or thiol acid salt having the formula:

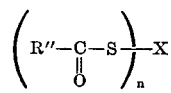

wherein R" is a hydrocarbyl group containing from 3 to 21 carbon atoms, n is an integer having a value of from 1 to 2, X is selected from the group consisting of hydrogen, alkali metal, alkaline earth metal, and acyl moieties having a hydrocarbyl essentially hydrocarbons residue and having from 1 to 17 carbon atoms.

9. The composition according to claim 1 wherein the combination of stabilizers are dispersed within the components prior to the polymerization of the polymer.

References Cited

UNITED STATES PATENTS

| | | | |
|---|---|---|---|
| 3,461,091 | 8/1969 | Stamm | 260—23 |
| 2,686,167 | 8/1954 | Albert | 260—45.7 |
| 3,058,937 | 10/1962 | Furness | 260—45.7 |
| 3,105,055 | 9/1963 | Aho | 260—45.7 |
| 3,247,150 | 4/1966 | Hahn | 260—45.7 |
| 3,352,816 | 11/1967 | Meyer | 260—45.7 |

DONALD E. CZAJA, Primary Examiner

V. P. HOKE, Assistant Examiner

U.S. Cl. X.R.

252—400, 406; 260—45.7, 880

PO-1050
(5/69)

UNITED STATES PATENT OFFICE
CERTIFICATE OF CORRECTION

Patent No. 3,542,725      Dated November 24, 1970

Inventor(s) Adam F. Kopacki, Stanley B. Mirviss and Sheldon F. Gel

It is certified that error appears in the above-identified patent and that said Letters Patent are hereby corrected as shown below:

Column 5, line 47, the word "phtthalate" should read --phthalate-- .

Column 6, line 42, second line in Table, after the word "band" insert --, minutes -- ; line 50, the word "formation" should read --formulation-- ; line 57, second line in Table, after word "band" insert -- , minutes -- ; lines 64 and 65, the word "represented" should read --repeated-- .

Column 7, line 28, the word "formation" should read --formulation-- .

Column 8, line 41, the word "hydrocarbons" should read --hydrocarbon-- .

SIGNED AND
SEALED
MAR 9 1971

(SEAL)
Attest:

Edward M. Fletcher, Jr.
Attesting Officer

WILLIAM E. SCHUYLER, JR.
Commissioner of Patents